(12) United States Patent
Haglund

(10) Patent No.: US 6,402,239 B1
(45) Date of Patent: Jun. 11, 2002

(54) SAFETY DEVICE IN A MOTOR VEHICLE

(75) Inventor: Lennart Haglund, Vårgårda (SE)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 09/355,085

(22) PCT Filed: Jan. 28, 1998

(86) PCT No.: PCT/SE98/00089

§ 371 (c)(1),
(2), (4) Date: Dec. 10, 1999

(87) PCT Pub. No.: WO98/32635

PCT Pub. Date: Jul. 30, 1998

(30) Foreign Application Priority Data

Jan. 24, 1997 (GB) .............................................. 9701491

(51) Int. Cl.⁷ .............................. B60R 21/00; B60N 2/44
(52) U.S. Cl. .............................. 297/216.13; 297/216.12; 296/68.1
(58) Field of Search ..................... 297/216.12, 216.13, 297/220; 296/68.1, 65.01, 65.02

(56) References Cited

U.S. PATENT DOCUMENTS 3,172,702 A * 3/1965 Rose ..................... 297/216.12
3,645,556 A * 2/1972 Kobori ................... 297/216.12
4,482,137 A   11/1984 Gavagan et al.
5,551,726 A    9/1996 Ament

FOREIGN PATENT DOCUMENTS

| DE | 27 39 741      | 3/1979  |
| DE | 41 23 655 A1   | 1/1993  |
| EP | 0 642 955 A1   | 12/1994 |
| WO | WO 91/12155    | 8/1991  |

* cited by examiner

Primary Examiner—Anthony D. Barfield
(74) Attorney, Agent, or Firm—Venable; Robert Kinberg

(57) ABSTRACT

A safety device in a motor vehicle comprises a roller retractor (2) mounted at the top of the back (1) of a vehicle seat. The roller retractor (2) has wound on it a sheet-like element or net (3) which is extractable from the roller to engage anchoring means secured in or adjacent the roof of the vehicle. The length of net (3) to be extracted from the roller retractor (2) is different in different positions of the back of the seat. The roller retractor mechanism is associated with a locking mechanism (5) which is actuated in at least one of the alternative positions of the back of the seat to lock the extraction of more than a predetermined length of the sheet-like element from the roller retractor (2). The length is sufficient to enable the sheet to be secured to connecting means provided in the roof of the vehicle.

20 Claims, 9 Drawing Sheets

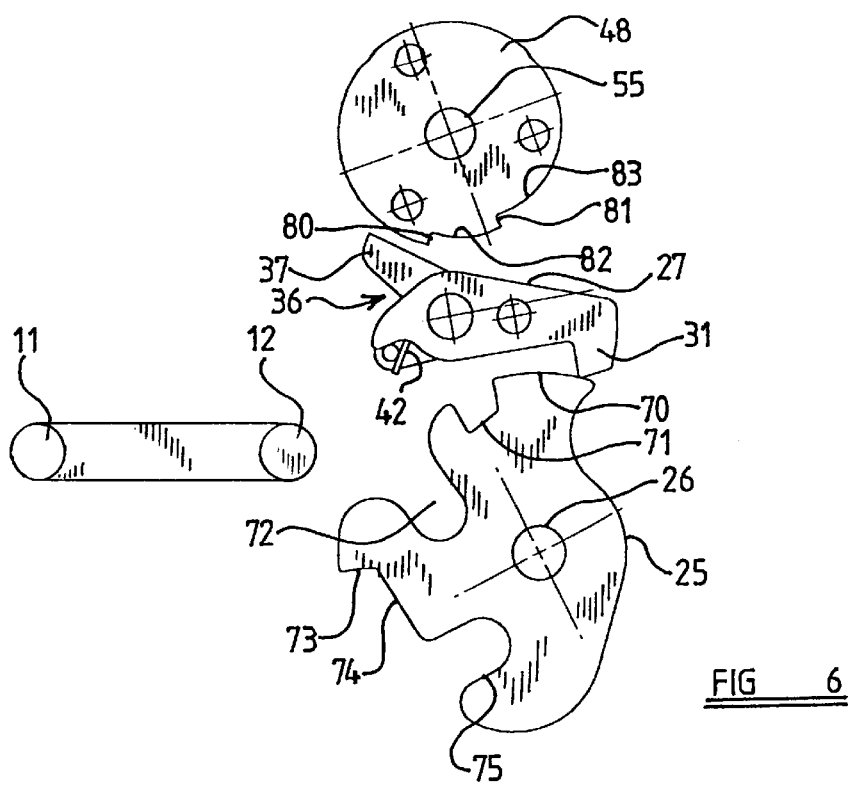
FIG 6
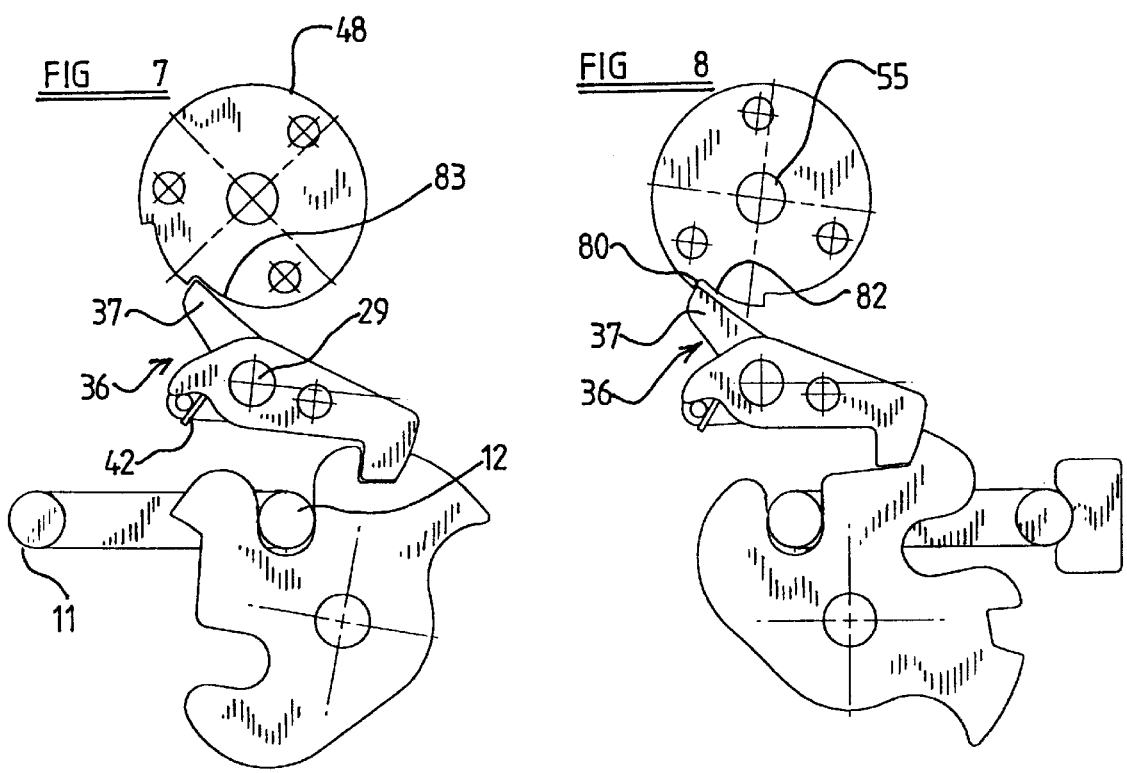
FIG 7
FIG 8

SAFETY DEVICE IN A MOTOR VEHICLE

FIELD OF THE INVENTION

The present invention relates to a safety device in a motor vehicle and more particularly relates to a safety device comprising a retaining element connected to the back-rest of the rear seat of a motor vehicle, the retaining element being adapted to extend between the back-rest of the rear seat of the vehicle and the roof of the vehicle in order to prevent luggage stored in the vehicle behind the back-rest of the rear seat moving forwardly should an accident arise in which the vehicle stops suddenly.

BACKGROUND OF THE INVENTION

It has been proposed to provide previously a retaining element in the form of a retractable net provided on a retractor roller mounted adjacent the top of the back-rest of a motor vehicle such as, for example, an estate car. In use, the net is pulled out over its full length and the free end of the net is engaged with anchorage points provided in the roof of the motor vehicle. It is to be appreciated that in this position, the net will prevent any objects present in the rear luggage compartment of the vehicle from moving forwardly into the part of the vehicle where the occupants of the vehicle are located, even if the vehicle does decelerate rapidly, for example in a crash. However, if the back-rest is tilted to a forward position, the net will be too short to reach the roof. If the net is made long enough to reach the roof when the back-rest is in a tilted forward position, then when the back-rest is in the elevated position, should an item of luggage impinge against the net during an accident situation, the net will have a sufficient length to permit the luggage to move forwardly into the compartment where the occupants of the vehicle are located.

The present invention seeks to provide an improved safety device.

SUMMARY OF THE INVENTION

According to this invention there is provided a safety device in a motor vehicle, the safety device comprising a roller retractor mounted adjacent the top of the back of a vehicle seat, the roller retractor having wound on it a sheet-like protective element, the seat back being moveable between alternate positions, the sheet-like element being extractable from the roller retractor to engage anchoring means secured in or adjacent the roof of the vehicle, the length of sheet-like material extracted from the roller retractor being different in the said different positions of the back of the seat, the roller retractor mechanism being associated with a locking mechanism, the locking mechanism being actuated in at least one of the said positions of the seat to lock the roller retractor to prevent the extraction of more than a predetermined length of said sheet from the retractor roller, the length being sufficient to enable the sheet to be secured to the connecting means provided in the roof of the vehicle.

Preferably said retractor comprises a retractor roller, the said sheet being wound on the roller.

Conveniently the roller is prevented from rotating by the locking mechanism.

Advantageously the locking mechanism comprises means adapted to engage an element co-rotating with the roller to prevent rotation of the roller, and actuating means, to actuate the engaging means, the actuating means incorporating a gear mechanism, there being selectively positionable means, which are positioned in dependence upon the position of the back-rest, adapted to engage part of said gear to prevent further rotation of the gear and to actuate the engagement mechanism.

In one embodiment the gear arrangement comprises a planetary gear.

Conveniently the planetary gear arrangement comprises a ring gear which is fixed in position relative to the back-rest, a planet holder which is rotatably mounted in position and which carries planet gears, and a sun gear engaged with the planet gears, the sun gear being connected to the said engagement means, a latch being provided which is movable to selected positions in dependence upon the position of the back-rest, the latch being adapted to engage engagement means provided on the planet holder.

Preferably the engagement means comprises one or more steps provided in the outer periphery of the planet holder.

In an alternative embodiment the gear comprises a ring-gear which is movably mounted in position, and adapted to be driven rotationally by a sun gear, and a sun gear engaging the ring-gear, the sun gear being connected to the engagement means.

Advantageously a latch is provided which is movable to selected positions in dependence upon the position of the back-rest, the latch being adapted to engage engagement means provided on the ring-gear.

Conveniently the engagement means comprises one or more steps provided in the outer periphery of the ring-gear.

Advantageously the engagement means comprise a clamping member having a periphery defining at least one cam surface and a movable element located between the cam surface and a clamping surface that surrounds the clamping member, the clamping member rotating with the roller extractor, the locking mechanism serving to retain said movable element substantially in position.

Conveniently a striker component is provided mounted in position and adapted to strike a locking member to cause the locking member to move when the seat back is moved to at least one predetermined position, the movement of the locking member changing the position of the latch.

Preferably the latch is carried by a catch that engages the locking member.

In order that the invention may be more readily understood, and so that further features thereof may be appreciated, the invention will now be described, by way of example, with reference to the accompanying drawings in which:

BRIEF DESCRIPTION OF THE DRAWINGS

FIG. 6 is a diagrammatic view illustrating the said component mounted on the body of the motor vehicle, and also illustrating a catch mechanism and a planet carrier for a planetary gear arrangement in a first condition, FIG. 7 is a view corresponding to FIG. 6 illustrating the arrangement in a second condition, FIG. 8 is a view corresponding to FIGS. 6 and 7 illustrating the arrangement in the third condition.

DETAILED DESCRIPTION OF THE INVENTION

Figure 1:
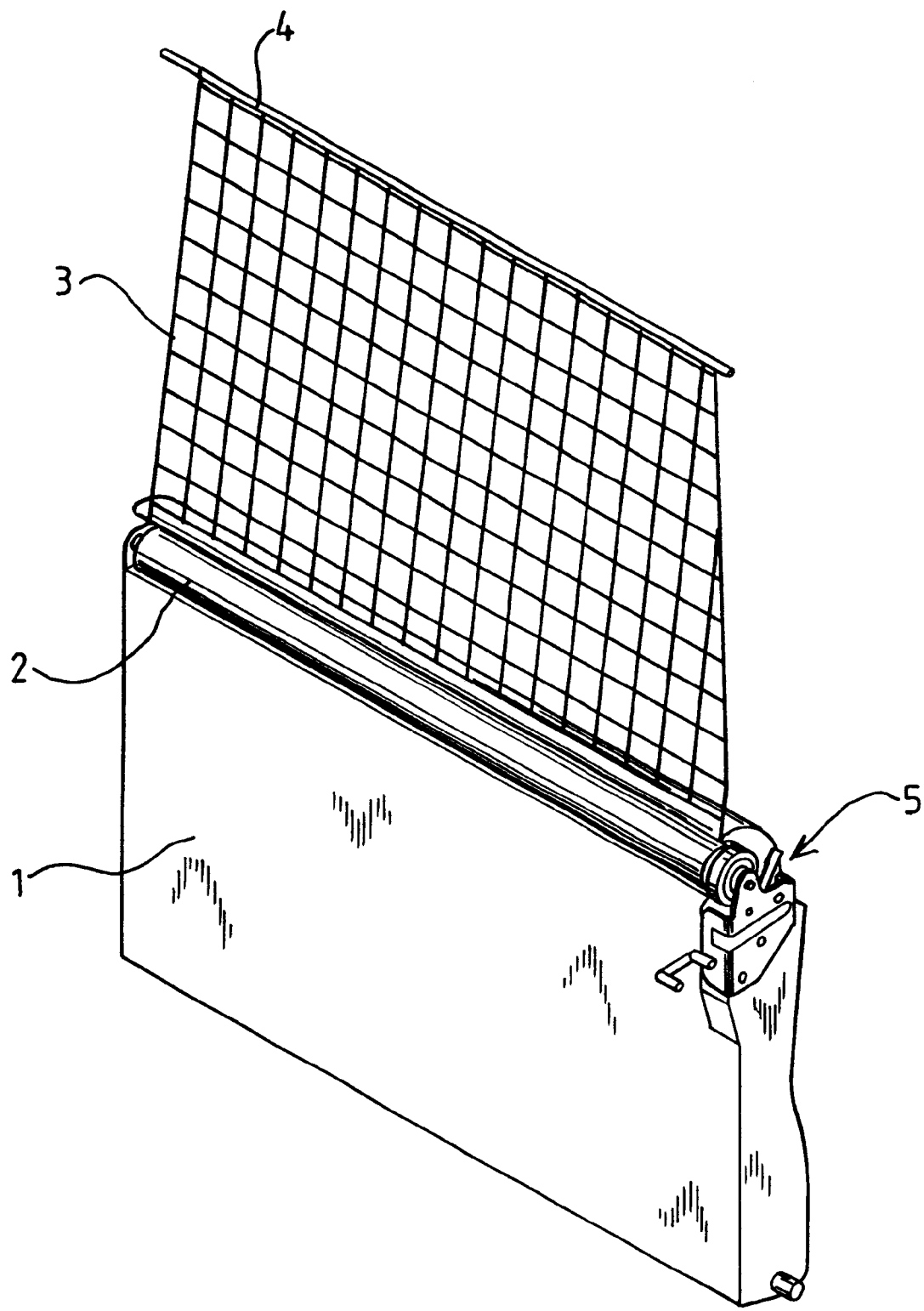
FIG. 1 is a diagrammatic side view illustrating a foldable back-rest for a rear seat of a motor vehicle, and an associated retractable luggable retaining element in the form of a net.

Referring initially to FIG. 1 of the accompanying drawings a back 1 of the rear seat of a vehicle is illustrated. The back 1 is provided, adjacent its upper edge, with a roller mechanism 2 extending the entire width of the back of the seat, which has retractably mounted upon it a luggage retaining element 3 in the form of a net. It is to be understood that alternatively the luggage retaining element could be in the form of a blind or an appropriate sheet of fabric.

The upper edge of the net 3 is provided with a rigid reinforcing element 4 adapted to be connected to anchoring means in the form of hooks or the like provided in the roof of the motor vehicle.

A locking mechanism 5 is provided which is associated with the roller mechanism 2, and which will be described in greater details hereinafter. The locking mechanism 5 is provided to lock the retractor roller, to prevent further net being permitted to be withdrawn. Thus, when the net is in the operative position as illustrated in FIG. 1, should the vehicle in which the arrangement is provided be involved in an accident which involves substantial deceleration, which might cause luggage located behind the seat back 1 to move forwardly, the net 3 will prevent the luggage from moving forwardly. However, the locking arrangement is such that if the seat back is moved to an alternative position, a further length of net may be paid out, the retractor roller net mechanism then again being locked to retain the net in position.

Figure 2:
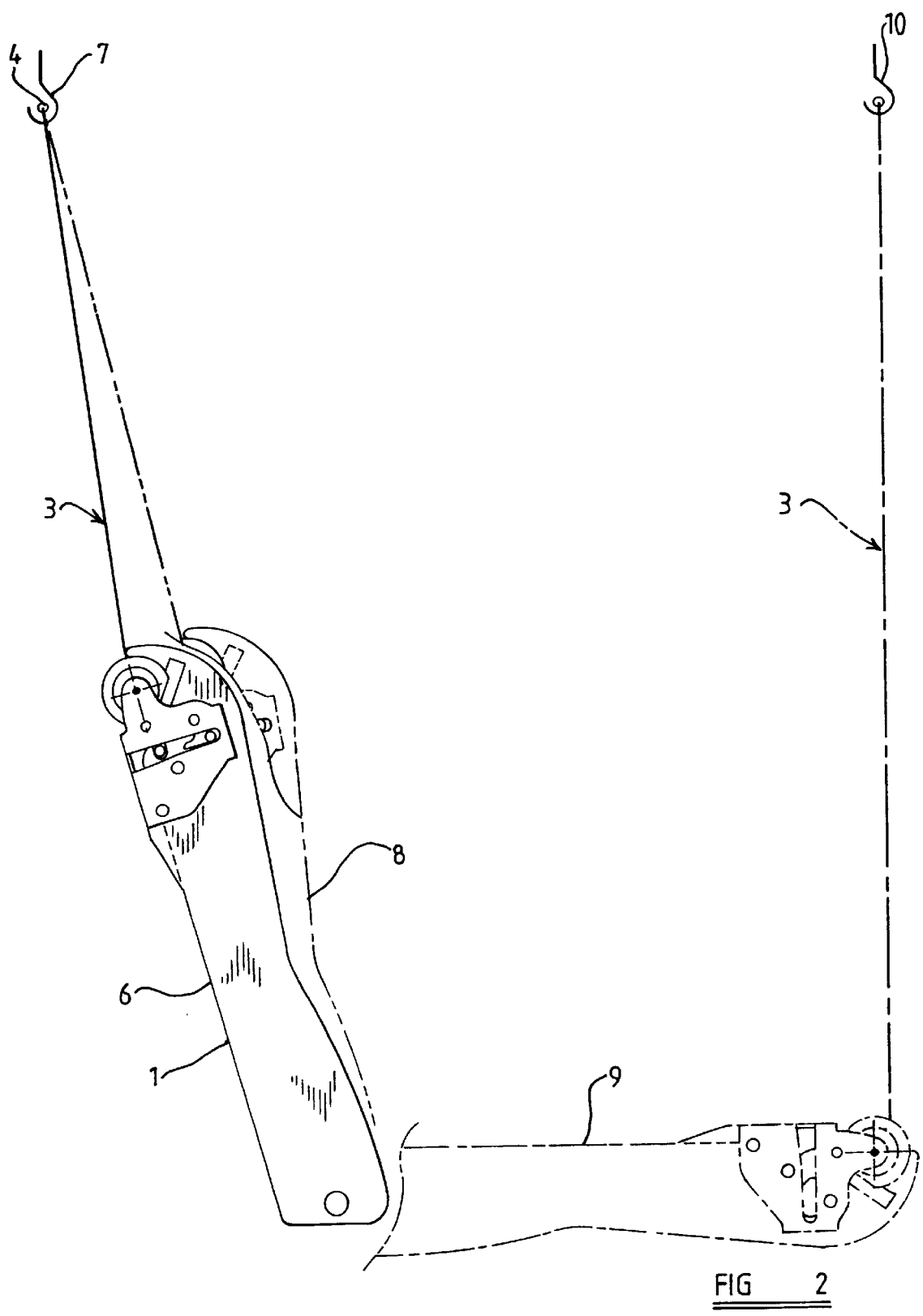
FIG. 2 is a diagrammatic side view illustrating the back-rest of FIG. 1 in three alternate positions.

Thus, as can be seen in FIG. 2, the seat back 1 may have an initial position 6 when the seat back reclines rearwardly. The net 3 is shown extending upwardly above the seat back, with the reinforcing rod 4 engaging a hook 7 which may be provided in the roof of the motor vehicle.

The seat back 1 may be tilted forwardly slightly, to a position as shown at 8 in FIG. 2. The net 3 may still be connected to the same hook 7, but the length of net extending between the back of the seat and the hook 7 is now less than the length of net extending between the back of the seat and the hook 7 when the back of the seat is in the position 6. Consequently, some net has been drawn on to the roller retractor to achieve the condition illustrated by the numeral 8 in FIG. 2. The mechanism will, however, again lock the roller retractor in this position to prevent further net being paid out.

The back of the seat 1 may be folded forwardly to be substantially horizontal, as shown at 9 in FIG. 2. A substantial length of net 3 may be withdrawn from the roller retractor 2, the net extending substantially vertically to a second hook 10 provided in the roof of the motor vehicle. In this condition, the full extent of the net has been paid out from the roller retractor mechanism.

Figure 3:
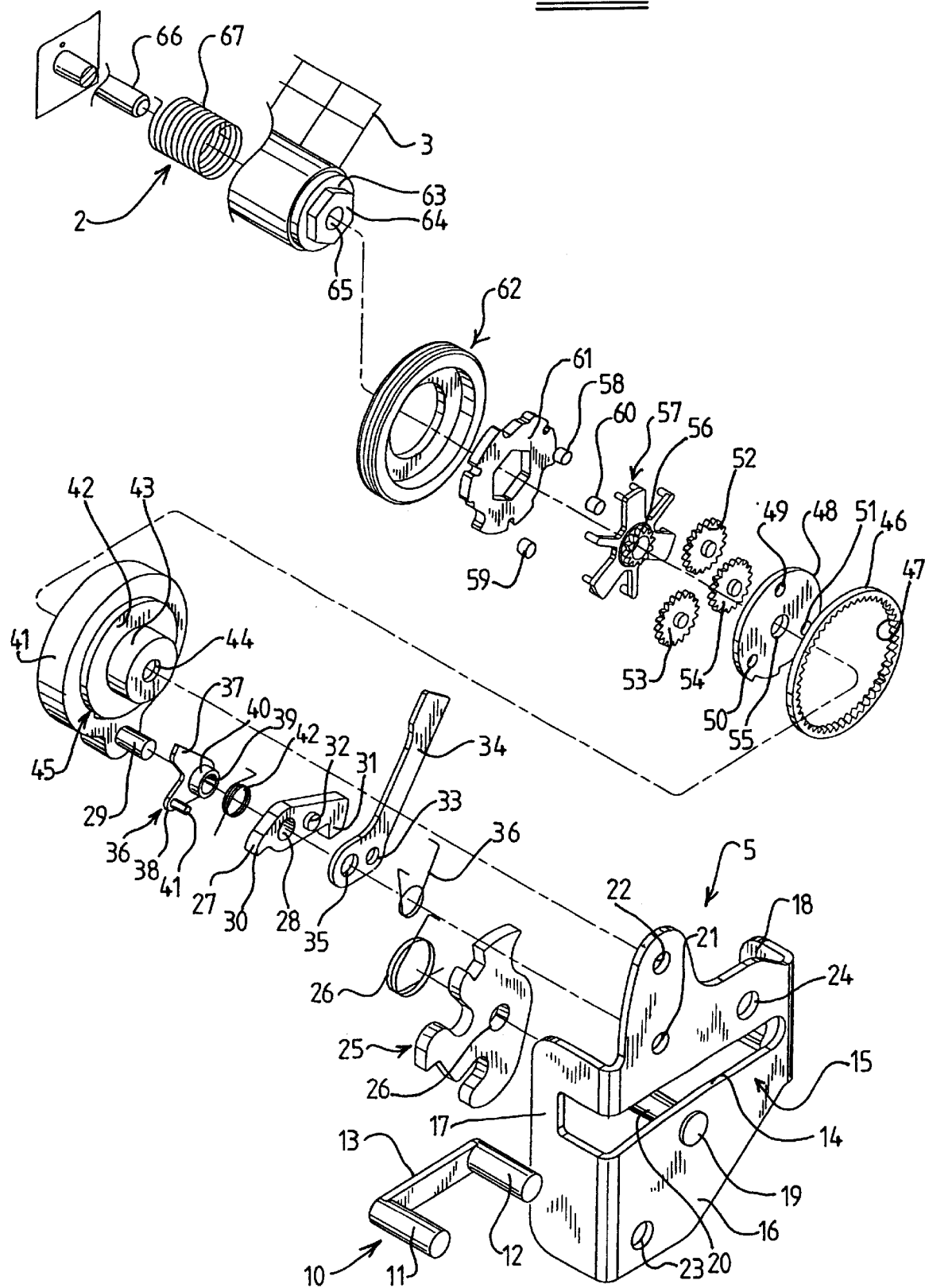
FIG. 3 is an exploded view of an assembly mounted on the back-rest which incorporates the retractable net, and also an element that is fixed in position on the body of the motor vehicle.

Referring now to FIG. 3 of the accompanying drawings, the catch arrangement 5 and the retractor roller 2 are illustrated in an exploded form.

A striker component 10 is provided adapted to be mounted securely to the body of the motor vehicle. The striker component 10 comprises two parallel spaced apart cylindrical striker elements 11,12 inter-connected by a bridging element 13.

The striker component 10 is positioned so that, as the seat back 1 is moved pivotally from the position 9 illustrated in FIG. 2, towards the position 6 as illustrated in FIG. 2, the striker elements enter a guide slot 14 formed in an end plate 15 which is mounted on the side part of the back 1 of the vehicle seat. The upper edge of the guide slot is linear and the lower edge is curved, the edges diverging adjacent the mouth of the slot. The end plate 15 comprises a planar plate region 16 defining forwardly extending wings 17,18, the slot 14 being formed in one of the wings 17 and in the planar portion 16.

The planar portion 16 defines an aperture 19 which receives a pivoting support stud 20, and further pivot support apertures 21,22 which will be referred to hereinafter. The planar portion 16 also defines two fixing apertures 23,24 adapted to receive fastening screws or the like to secure the end plate 15 in position.

The pivoting support stud 20 pivotally supports a locking element 25, which defines a substantially centrally located aperture 26 which is mounted on the stud 20, and which has a convoluted exterior which will be described hereinafter in greater detail. The locking element 25 is associated with a biassing spring 126 which imparts a predetermined rotational bias to the locking element 25.

A catch 27 is provided which forms a further part of the locking mechanism, the catch 27 comprising an elongate element defining an aperture 28 which is mounted on a pivot stud 29, the pivot stud being received in the aperture 21. The catch 27 defines a forwardly extending nose 30, on one side of the aperture 28 and on the other side of the aperture 28 defines a depending lug 31 and an axially extending projection 32 of cylindrical form.

The projection 32 is received within an aperture 33 formed in an elongate manually operable release arm 34. The release arm 34 defines a further aperture 35 which is received on the pivot stud 29. A spring 36 is provided to bias the manual release arm in a predetermined rotational direction.

A latch 36 is provided which is also mounted on the pivot support stud 29. The latch 36 comprises two diverging arms 37,38. An aperture 39 extending though the latch 36 is concentric with a tubular projection 40 which provides a bearing effect. The arm 38 carries an axially extending cylindrical projection 41. A biassing spring 42 is provided associated with the latch adapted to bias the latch in an appropriate direction.

The pivot stud 29 is formed on the exterior a planetary gear housing 41. The planetary gear housing is of substantially circular form having co-axially mounted on the end face directed towards the end plate 15, a first substantially cylindrical projection 42 of a further diameter and a co-axially located second cylindrical projection 43 of a lesser diameter. Formed in the end face of the projection 43 is an aperture 44 adapted to receive a bearing element, as will be described hereinafter, which is received in the bearing aperture 22 formed in the end plate 15.

A slot 45 is formed in the side wall of the projection 42 of greater diameter in the vicinity of the a pivot stud 29. The slot is so located that when the latch 36 has been mounted on the pivot stud 29, the arm 37 of the latch may be inserted through the slot 45 as the latch rotates about the pivot axis defined by the pivot stud 29.

The planetary gear housing is fixed to the back-rest of the motor vehicle and contains, within the part of the housing of greatest diameter (i.e. not within the projections 42 or 43), a ring gear 46 which is fixed in position and which has inner toothing 47. The ring gear 46 forms the outer gear of a planetary gear system. The planetary gear system incorporates a substantially circular gear carrier 48 which will be described hereinafter in greater detail, which defines three apertures 49,50,51 at equi-spaced regions on which are mounted three planet gears 52,53,54 and which also defines a central aperture 55. The planet carrier 48 is located in the first cylindrical projection 42 of greatest diameter provided on the planetary gear housing 41. The planet gears 52,53,54 are then located in a position where they are co-planar with the ring-gear 46 and have their outer-most teeth in engagement with the toothing 47 provided on the ring-gear 46. A central sun gear 56 is provided which defines a central aperture 57, the sun gear being located to be in engagement with the inner peripheries of the planetary gears 52,53,54.

The sun gear 56 is associated with a spider element 57 having six projecting arms which form part of a clutch as will be described in greater detail hereinafter. Three of the arms of the spider element 57 are adapted to engage clamping rollers 58,59,60 which are held in position against a clamping element 61 which has convoluted exterior (which will be described in greater detail hereinafter), which define cam surfaces. The clamping element 61 is located within a clamping ring 62 which is connected to the open end of the planetary gear housing 41.

The spider 57 and the associated components, including the rollers 58,59,60, the clamping element 61 and the clamping ring 62 form a clutch that effectively secures the roller retractor mechanism 2 to the locking arrangement 5 in order to lock the roller to prevent the withdrawal of further net from the roller retractor mechanism 2.

The roller retractor mechanism 2, as can be seen more clearly in FIG. 3, comprises a roller drum 63 upon which the net 3 is wound. The roller drum has, at the illustrated end, a bearing 64 having a hexagonal outer periphery, and a substantially cylindrical inner bore 65. The bore 65 is mounted on a support rod 66, the support rod 66 also rotatably supporting the sun gear 56, and the planet carrier 48 (by passing through the aperture 45), and also passing through the aperture 44 in the planetary gear housing 41 being received in the aperture 22 formed in the planar portion 16 of the end plate 15. A helical spring 67 is provided located between the rod 66 and the drum 63 in order to provide a rotational bias to the drum tending to retract the net 3 on to the drum.

Figure 4:
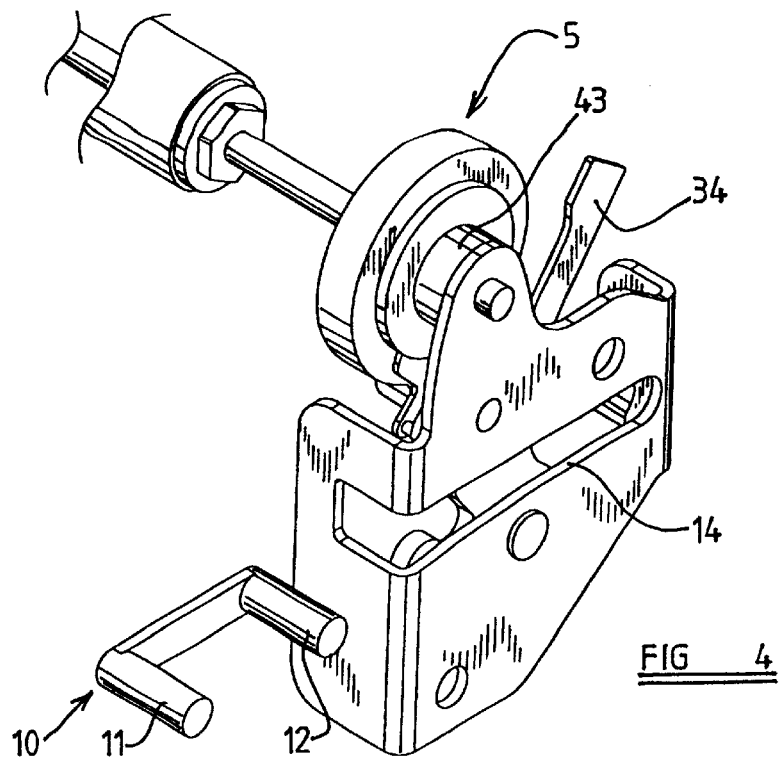
FIG. 4 is a diagrammatic perspective view illustrating the component shown in FIG. 3 when in the assembled state, whilst also illustrating the component mounted on the body of the motor vehicle.

FIG. 4 illustrates the components of the locking mechanism 5 when in the assembled state. It can be seen that the projection 43 provided on the planetary gear housing 41 serves the function of spacing the main part of the planetary gear housing 41 from the end plate 15 by an appropriate distance to permit the locking element 25, the catch 27 and the associated manual release lever 34 and also the latch 37 between the planetary gear housing 41 and the end plate 15. It can be seen that the free end of the manual release arm 34 is accessible.

Figure 5:
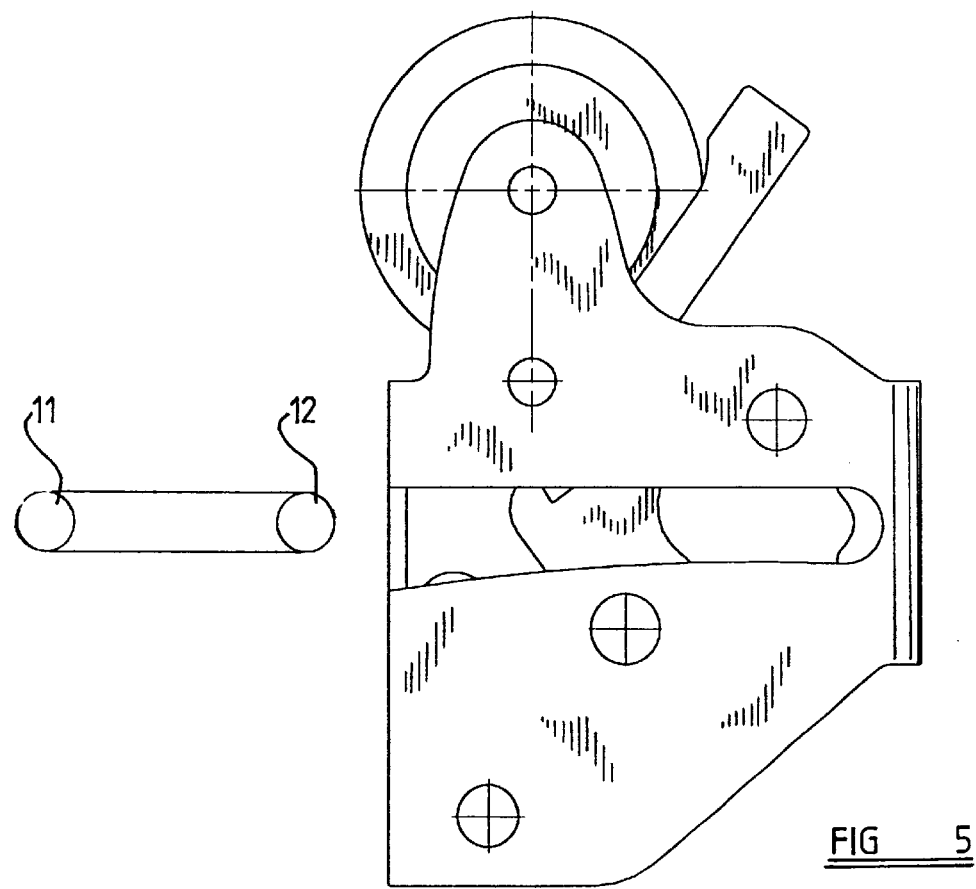
FIG. 5 is a side elevational view of the apparatus shown in FIG. 4.

The striker component 10 is illustrated in position, and it can be seen that the striker elements 11,12 are aligned with the guide slot 14. As shown in FIG. 5, the striker elements 11,12 of the striker component 10 are located in at a position spaced apart in a horizontal plane. It can be seen more clearly that the upper edge of the guide slot 14 is linear, whereas the lower edge is slightly curved.

Referring now to FIG. 6, the locking element 25 is illustrated, together with the catch 27, the latch 36 and the planet carrier 48.

The locking element 25 has a convoluted exterior. An initial curved region 70, which is located at a position which is substantially tangential with reference to the axis defined by the aperture 26 is initially positioned, so that the depending lug 31, provided on the catch 27, is resting upon the curved surface 70. The curved surface 70 terminates, at its left-hand end, as shown in FIG. 7, with a recess 71. The configuration of the recess 71 corresponds with the configuration of the depending lug 31.

Adjacent the recess 71 is a substantially "U"-shaped channel 72 having a width equal to the diameter of the striker element 12 of the striker component 10. In an initial condition illustrated in FIG. 6, the channel 72 is inclined downwardly towards the right, but an extension of the upper-most edge of the channel is co-aligned with the striker elements 11,12.

Moving further in a clockwise direction about the outer periphery of the locking element 25, it can be seen that the outer periphery defines, adjacent the lower wall of the channel 72, an outwardly directed abutment face 73 which is located adjacent a linear portion 74 which merges into a further inwardly directed U-shaped channel 75 which has a width equal to the width of the striker element 11.

The planetary gear carrier 48 is of substantially circular form, but the outer periphery defining two radially inwardly directed discontinuities or steps. The step 80 represents a step between the outer-most periphery of the planetary gear carrier 48, and the planetary gear carrier 48 then has an outer periphery portion 82 which is spaced from the aperture 55 by a distance less than the distance to the periphery of the planetary gear carrier located on the other side of the inwardly directed step 80. Similarly the step 81 extends to a further arcuate portion 83 of the exterior of the planetary gear carrier 48, this portion being located a lesser distance from the aperture 55 than the portion 82. The portion 83 does merge, as one continues to move notionally around the planetary gear carrier in an anti-clockwise direction with a portion which extends back out to the full diameter of the planetary gear carrier as found as one re-encounters the inwardly directed step 80.

It is to be observed that in the condition illustrated in FIG. 6, with the depending lug 31 of the catch 27 engaging the surface 70, the arm 37 of the catch 36 is spaced from the outer periphery of the planetary gear carrier 48, permitting the planetary gear carrier 48 to rotate freely. As will become clearer from the following description, the planetary gear carrier rotating any net is withdrawn from the roller retractor. Thus in this condition of the described embodiment the full length of the net 3 can be withdrawn from the roller retractor 2. It is to be appreciated, therefore, that the catch will have the condition illustrated in FIG. 6 when the seat back is in the position 9 as illustrated in FIG. 2.

It is also to be observed, with reference to FIG. 6, that the latch 36 is pivotally mounted for movement relative to the catch 27 and is spring-biassed, by spring 42 to a position in which the upper arm 37 extends upwardly above the catch 27. The spring biassed arm enters the planetary gear housing 41 (not shown in this figure) through the slot 45, so that the free end of the arm 37 is located adjacent the periphery of the planet carrier 48. The projection 41 provided on the lower arm 38 of the latch engages the underpart of the forwardly projecting nose 30 provided on the catch 27, to prevent the latch 37 rotating too far.

The arrangement will maintain this condition, as illustrated in FIG. 6, until the seat back has been moved up to the position 8 as illustrated in FIG. 2. As the seat back approaches the position 8, as illustrated in FIG. 2, the striker component 10 begins to enter the guide slot 14, and the striker element 11 engages the upper part of the side wall of the slot 72, causing the locking member 25 to rotate in a clockwise direction to such an extent that against the spring bias imparted to the combination of the latch 27 and the manual release lever 34 by the spring 36, the latch 37 moves in a clockwise direction to bring the depending lug 31 into an engagement with the recess 71. The components of the locking mechanism initially illustrated in FIG. 6 then have the condition illustrated in FIG. 7. It can be seen that the U-shaped channel 72 is now substantially vertically oriented, and consequently retains firmly within it the striker element 12. The depending lug 31 is received within the recess 70, thus preventing further rotational movement of the locking element 25.

It can be seen that the upper arm 37 of the latch 36 has been moved to an upper position, as compared with the position illustrated in FIG. 6. The free end of the arm is biassed against the arcuate surface 83 forming part of the periphery of the planet gear holder 48. Should the planet gear holder 48 attempt to rotate in the anti-clockwise direction, such rotation will be prevented by engagement of the step 81 with the end of the upper arm 37 of the catch 36. However, should the planet carrier 48 rotate in a clockwise direction, as the planet carrier rotates, the outer periphery of the planet carrier will engage the upper surface of the upper arm 37 of the latch 36, causing the latch 36 to pivot about the pivot axis defined by the support stud 29, with the lower arm moving downwardly against the bias provided by the spring 42.

It is to be appreciated that as the planetary gear moves in the anti-clockwise direction, net 3 is being paid out from the retractor roller 2, whereas when the planet carrier 48 moves in a clockwise direction, the net 3 is being wound on to the retractor roller 2. The step 81 is so positioned that the step 81 is brought into engagement with the free end of the arm 37 of the latch 36 when a sufficient length of net has been paid out to reach from the top of the back 1 of the seat to the hook 7 in the roof when the seat is in the position 8 as illustrated in FIG. 2 of the accompanying drawings.

If the seat back is moved from the position illustrated at 8 in FIG. 2 to the position illustrated at 6 in FIG. 2, the effect is that the striker component 10 is moved further into the slot 20. However, this movement can only be achieved if the manual release arm 34 is initially moved so as to disengage the downwardly directed lug 31 from the recess 71. When the lug 31 has been released from the recess 71, the seat back may, of course, be moved forwardly to occupy the position illustrated at 9 in FIG. 2, in which case the spring 26 will return the locking element 25 to the position in FIG. 6, or instead, the seat back may be moved to have the position illustrated at 6 in FIG. 2, in which case the striker component 10 will be moved further into the slot 14, causing the locking element 25 to rotate further in the clockwise direction as shown in FIGS. 6 to 8 against the bias provided by the spring 26. It can be seen, therefore, that as the locking member 25 continues to rotate, the striker element 12 moves out of the channel 72, whilst the striker element 11 moves into and is received by the channel 75. If the manual release arm is then released, the depending lug 41 carried by the catch 27 engages the abutment 73 with the lower end of the depending lug resting on the planar surface 74. The spring bias provided by the spring 26 biases the abutment 73 of the locking member 25 into firm engagement with the depending lug formed on the catch 27.

It is to be noted that when the catch is in this condition, the upper arm 37 of the catch 36 is spaced slightly further out from the central aperture 55, than when the components were in the condition illustrated in FIG. 7. The free arm 37 of the catch 36 is now positioned to engage the step 80 and the associated arcuate surface 82. Again, rotation of the planet carrier in the anti-clockwise position is prevented, whilst rotation in the clockwise direction is permitted.

Figure 9:
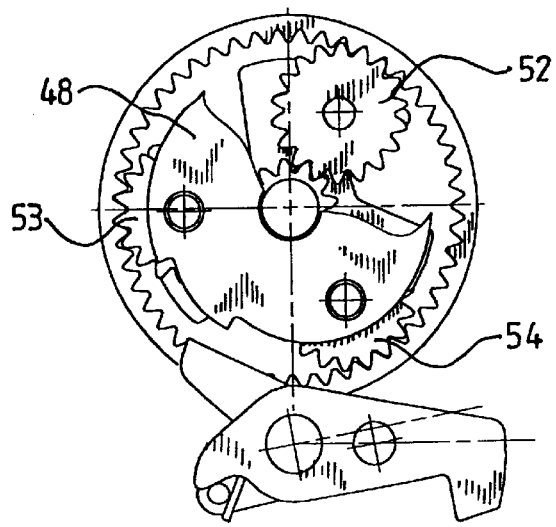
FIG. 9 is a diagrammatic view illustrating the catch, and also illustrating the planetary gear arrangement (with parts thereof cut away for the sake of clarity of illustration) in a first condition.

FIG. 9 illustrates the catch and latch in position of FIG. 6, showing the planet carrier 48 and the associated planetary gear wheels. It can be seen quite clearly, in this condition, that the planet carrier 48 and the associated planetary gear wheels 52,53,54 may rotate freely.

Figure 10:
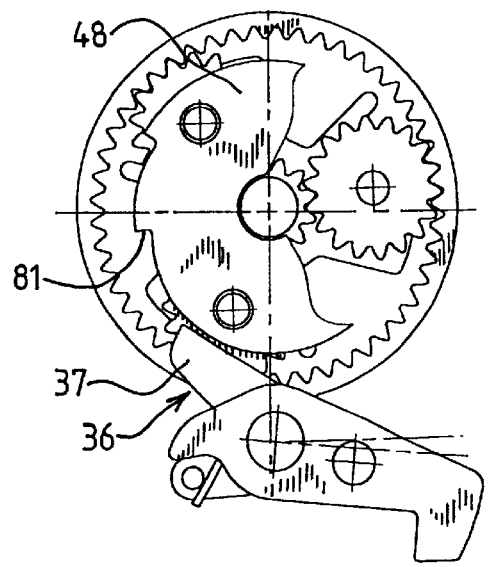
FIG. 10 is a view corresponding to FIG. 9 illustrating the arrangement in the second condition.

FIG. 10 illustrates an alternative position, corresponding to the position of FIG. 6, and it can be seen that the latch 36 is in such a position that the free end of the upper arm 37 is substantially co-aligned with the step 81 of the planet carrier 48. Should the planet carrier 48 rotate, from the position illustrated, in the anti-clockwise direction, which is the direction in which it will rotate should the net be drawn out from the roller retractor 2, the net will be paid out until step 81 abuts the free end of the arm 37. No further net may then be paid out.

Figure 11:
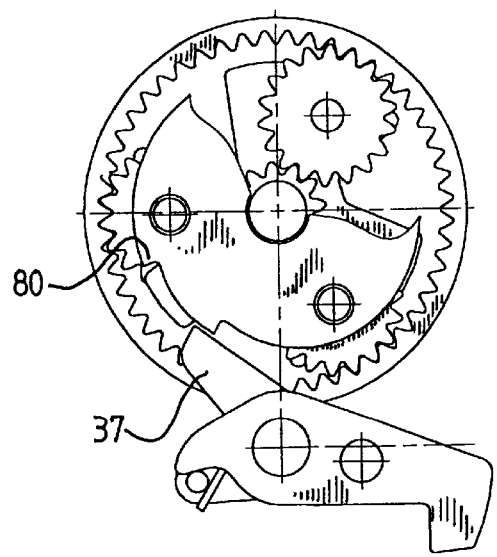
FIG. 11 is a view corresponding to FIGS. 9 and 10 illustrating the arrangement in a third condition.
Figure 12:
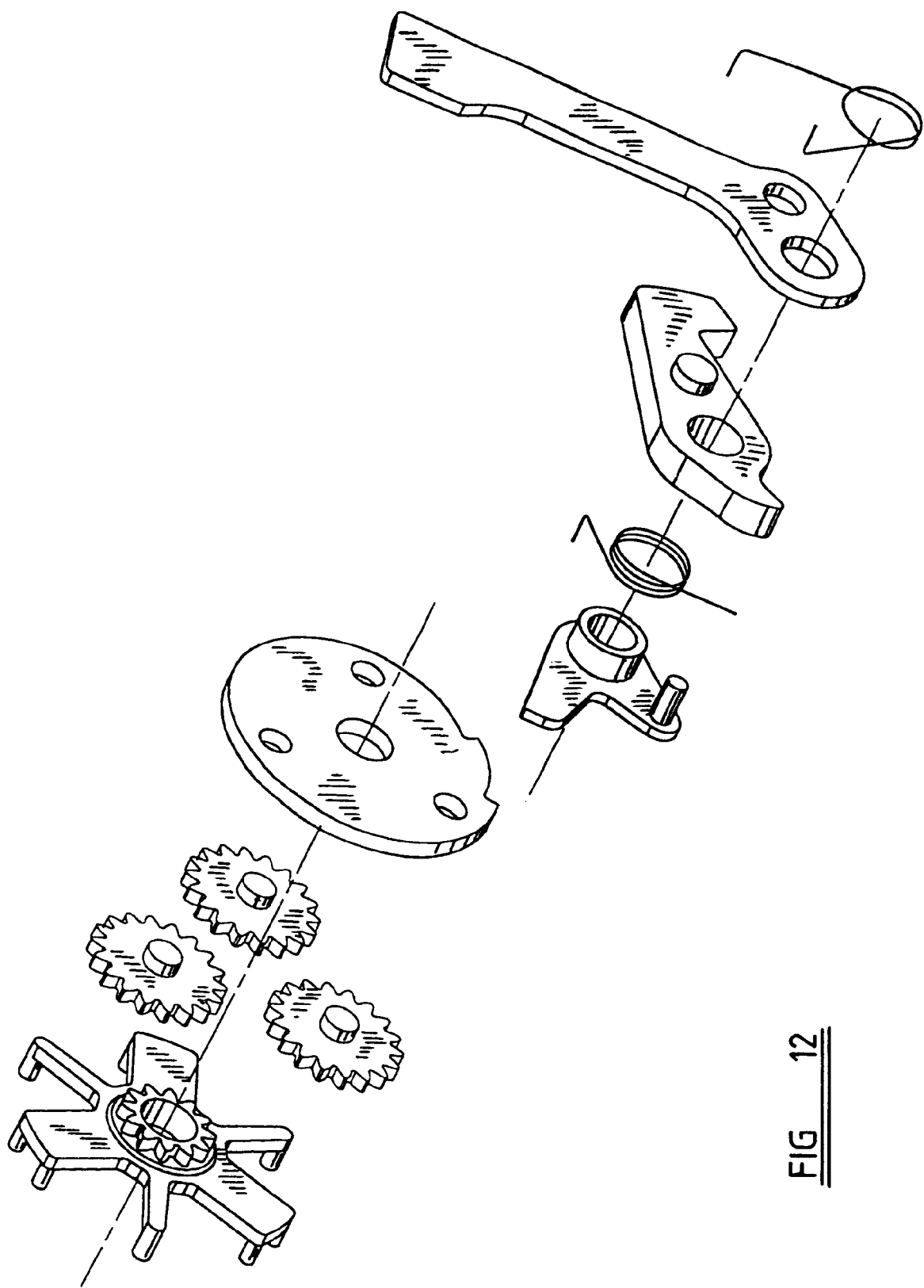
FIG. 12 is an exploded view illustrating the catch, and the planet carrier, together with an associated manually operable lever, and also associated with one component of a clutch assembly.

FIG. 11 is a view corresponding to FIG. 10 illustrating a condition equivalent to that shown in FIG. 8. Here, it is to be noted that the further length of net may be pulled out, as compared with the condition shown in FIG. 10, while the planet carrier 48 rotates by a few more degrees. However, in the condition of FIG. 11, the free end of the arm 37 is rotated substantially in alignment with the step 80 of the planet carrier, and when the planet carrier has rotated so that the step 80 is brought into abutment with the free end of the arm 37, the planet carrier will again be locked in position.

When the planet carrier is locked in position, the plant wheels 52,53,54 are locked in position and consequently, the sun gear 56 will be locked in position. As a consequence the spider 57 is locked in position.

Figure 13:
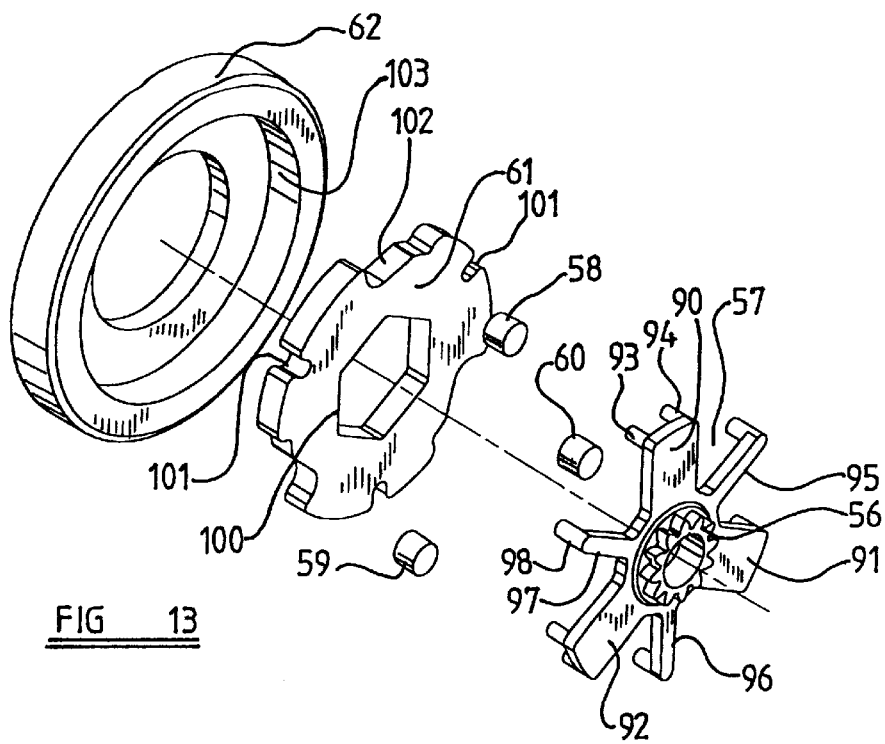
FIG. 13 is an exploded view of the clutch assembly.
Figure 14:
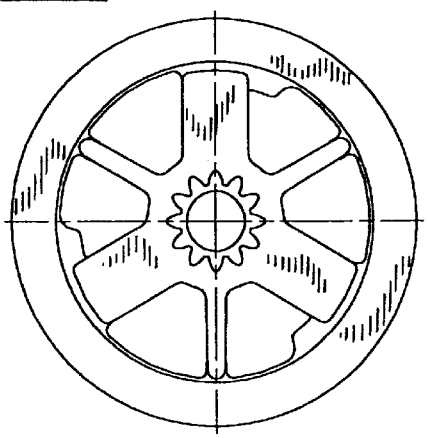
FIG. 14 is an elevational view of the clutch in a first condition.

FIG. 13 illustrates the spider 57, the rollers 58,59,60, the clamping element 61 and clamping ring 62. The spider 57 may be moulded of a plastics material.

It is to be observed that the spider 57 comprises six arms. Three arms 90,91,92 are equi-angularly spaced. Each arm is relatively wide and is thus rigid. Each arm terminates with two forwardly directed protrusions 93,94.

Intermediate the arms 90,91,92 are three equi-angularly spaced arms 95,96,97. Each of these arms terminates in a forwardly directed protrusion 98. The arms 95,96,97 are made sufficiently thin to be resilient and flexible.

The clamping element 61 has a substantially hexagonal central aperture 100 formed therein which is adapted to receive the hexagonal outer surface of the bearing 64 provided at the end of the roller 63 so that the clamping element 61 moves in synchronism with the roller 63.

The outer surface of the clamping element 61 defines three equi-angularly spaced recesses of U-configuration, such as the recess 101 each adapted to receive a projection such as the projection 98 on one of the resilient arms 95,96,97.

Equi-angularly spaced between the recesses 101 are inclined cam faces 102. As can be seen in FIG. 13, each cam face 102 is associated with a roller 58, the roller 58 being located between the arms 93,94 of a substantially rigid arm such as the arm 90. As can be seen in FIG. 13, the roller 58 is initially separated from the inner periphery 103 of the clamping ring 62.

Figure 17:
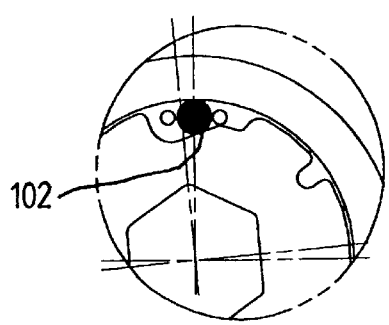
FIG. 17 is a view corresponding to FIG. 15 illustrating the position of the roller when the clutch is in the alternative condition of FIG. 16.

In the event that the sun gear 56 is prevented from rotating, should the roller 63 still rotate in a sense in which the net 3 is being paid out from the roller, the small rollers 58,59,60 will be entrained by the relative movement of the member 61 (which co-rotates with the roller 63) and will move up the cam faces 102 (see FIG. 17) to become clampingly engaged between the clamping member 61 and the inner face of the clamping ring 62. As this occurs the resilient arms 95,96,97 become slightly deformed. The rollers, as seen in FIG. 17, become wedged firmly between the cam faces 102 and the inner periphery of the clamping ring 62, and thus prevent further rotation of the roller 63 of the retractor roller mechanism 2. The resilience in the arms 95,96,97 returns the rollers 58,59,60 to their initial position (i.e. the FIG. 13 position) when tension applied to the net tending to withdraw the net from the roller 63 is released.

Figure 18:
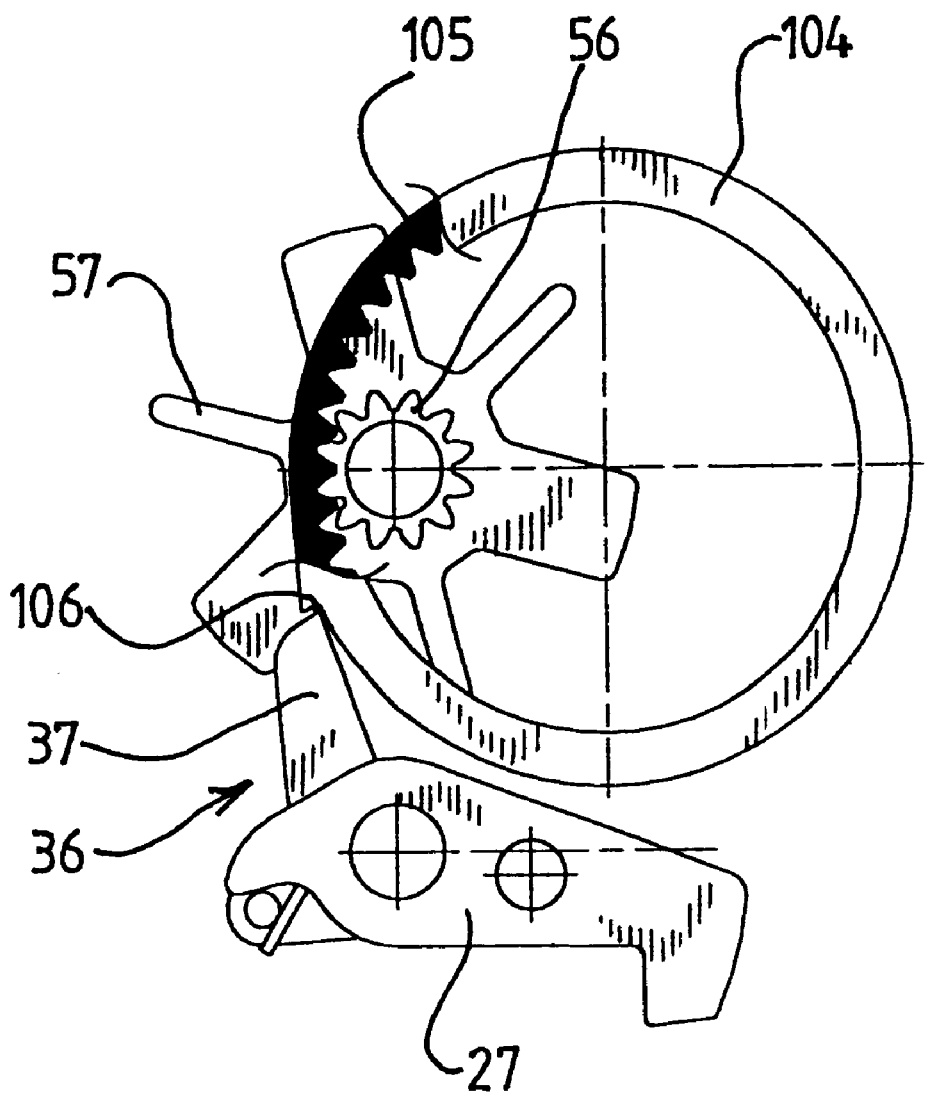
FIG. 18 is a view, with parts thereof cut away illustrating the catch, a ring-gear and part of a clutch assembly of a modified embodiment of the invention.

Referring now to FIG. 18 of the accompanying drawings, a modified embodiment of the invention is illustrated in which the planetary gears, the planetary gear carrier and the fixed ring gear are replaced by a single moveable ring gear 104, which has a toothed interior 105 which engages with the sun gear 56 mounted on the spider 57. It can be seen that the axis of rotation of the spider is no longer concentric with the axis of the ring gear.

The exterior periphery of the ring gear defines a discontinuity or step 106 which corresponds to the step 80 or the step 81 described above. The upper arm 37 of the latch 36 is of a more upwardly directed configuration than in the previously described embodiment, but it can be seen that with the catch 27 in the position illustrated, the upper arm 37 of the latch 36 is located to engage the step 106 to prevent rotation of the ring gear 104 in the anti-clockwise direction. This will, of course, stop rotation of the sun gear 56 with the consequences described above with regard to the earlier embodiments.

It is to be appreciated that in the embodiment of FIG. 18 only one step 106 is provided, corresponding to a specific length of net being withdrawn from the retractor roller 2.

Figure 16:
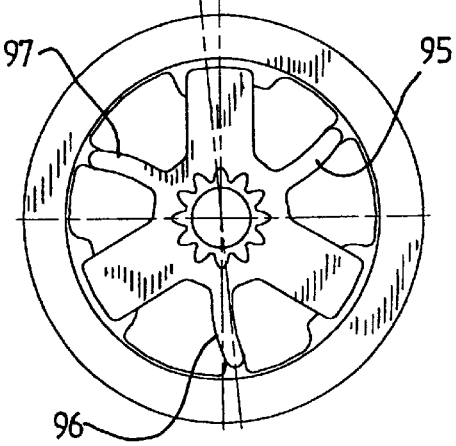
FIG. 16 is a view corresponding to FIG. 14 illustrating the clutch assembly in an alternative condition.
Figure 15:
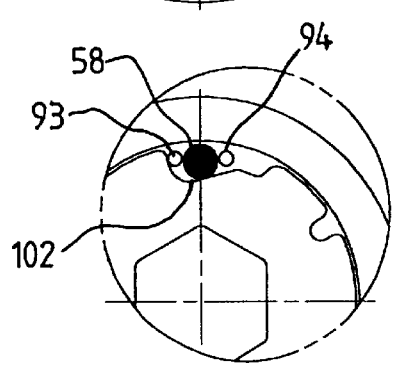
FIG. 15 is a scrap view illustrating the position of a roller forming part of the clutch assembly when the clutch assembly is in the condition illustrated in FIG. 14.

However, in this embodiment, two steps could be provided, as in the embodiment described above, corresponding to two slightly different lengths of net. Of course, the embodiment of FIG. 1 might be modified to have only a single step as in the embodiment of the FIG. 16.

It is to be appreciated, therefore, that in use of the embodiments of the invention, the amount of net that can be withdrawn from the retractor roller depends upon the position of the back of the seat, and the length of net is sufficient to reach the associated hook or hooks provided in the ceiling so that he net is stretched relatively a tightly between the back of the seat and the hooks provided in the ceiling of the motor vehicle to prevent luggage from travelling forwardly.

What is claimed is:

1. A safety device and seat combination for use with a motor vehicle having a roof, comprising:
   a seat including a seat back having a top portion, wherein the seat and seat back are moveable among various positions;
   a roller retractor mounted adjacent the top portion of the seat back and including a roller;
   a protective element having a length wound upon the roller of the roller retractor and a length extracted from the roller retractor, wherein the extracted length of the protective element has one end adapted to be anchored to the roof of the vehicle, and wherein the extracted length and the wound length are variable in dependence on the various positions of the seat back;
   at least one means for anchoring the end of extracted length of the protective element to the roof of the vehicle; and
   a locking mechanism for engaging the roller retractor so that no more than a predetermined length of the protective element can be extracted from the roller retractor, wherein the predetermined length is of a sufficient length to enable the end of the extracted length of the protective element to be secured to the means for anchoring.

2. A safety device and seat combination according to claim 1, wherein the anchoring means is adapted to be mounted on the roof of the vehicle.

3. A safety device and seat combination according to claim 1, wherein the roller retractor comprises a retractor roller and the protective element is reversibly wound on the retractor roller.

4. A safety device and seat combination according to claim 1, wherein the locking mechanism is constructed and arranged so that the retractor roller is prevented from rotating when the locking mechanism is engaged.

5. A safety device and seat combination according to claim 1, further comprising a release mechanism for releasing the locking mechanism from engagement with the roller.

6. A safety device and seat combination according to claim 1, wherein the retractor roller includes an element that rotates with the roller, and wherein the locking mechanism comprises
   roller engagement means for engaging the roller element to prevent rotation of the roller,
   means for actuating the roller engagement means, said actuating means having a gear mechanism, and
   selectively positionable means for engaging the gear mechanism such that the extracted length is dependent upon a position of the top portion of the seat back relative to the anchoring means.

7. A safety device and seat combination according to claim 6, wherein the gear mechanism comprises a planetary gear mechanism having planetary gears and a sun gear.

8. A safety device and seat combination according to claim 7, wherein the planetary gear mechanism further comprises
 a ring gear fixedly mounted in a position relative to the seat back,
 a planetary gear carrier rotatably mounted in a position for carrying the planetary gears, wherein the sun gear engages the planetary gears and is connected to the roller engagement means, and
 a latch being movable to selected positions depending upon the position of the seat back and adapted to engage the planetary gear carrier.

9. A safety device and seat combination according to claim 8, wherein the planetary gear carrier has an outer periphery and wherein the engagement means comprises at least one step provided in the outer periphery of the planetary gear carrier.

10. A safety device and seat combination according to claim 9, further comprising a striker component and locking member, wherein the striker component is constructed and arranged to strike the locking member such that the locking member moves when the seat back is moved to at least one of the various positions such that the position of the latch is changed.

11. A safety device and seat combination according to claim 10, further comprising a catch adapted to engage the locking member and carry the latch.

12. A safety device and seat combination according to claim 11, further comprising releasing means for actuating the latch, catch, and planetary gear mechanism such that the roller retractor rotates freely until the locking mechanism re-engages.

13. A safety device and seat combination according to claim 6, further comprising at least one ring and sun gear mechanism connected to the roller engagement means, wherein the ring and sun gear mechanism has at least one ring gear with an outer periphery and at least one sun gear, and wherein the at least one ring gear is movably mounted such that it is in direct contact with and is driven rotationally by the at least one sun gear.

14. A safety device and seat combination according to claim 13, wherein the ring gear has an outer periphery and wherein the roller engagement means comprises at least one step provided in the outer periphery of the ring gear.

15. A safety device and seat combination according to claim 6, wherein the roller engagement means further comprises a clamping member having a periphery defining at least one cam surface and a movable clamping element located between the cam surface and a clamping surface that surrounds the clamping member, wherein the clamping member is constructed and arranged to rotate with the roller, and wherein the locking mechanism is constructed and arranged to retain said movable clamping element substantially in a position.

16. A safety device and seat combination according to claim 1, further comprising a latch movable to selected positions in dependence upon the position of the seat back and adapted to engage the roller engaging means.

17. A safety device and seat combination according to claim 1, wherein the protective element comprises one or more from the group consisting of netting, fabric, screening and sun-screening.

18. A safety device and seat combination according to claim 1, wherein the roller retractor has two ends, and wherein the locking mechanism includes a first locking mechanism at one end of the roller retractor and a second locking mechanism provided at the other end of the roller retractor.

19. A safety device and seat combination according to claim 1, wherein the anchoring means is constructed and arranged to provide a number of different anchoring positions.

20. A safety device and seat combination according to claim 1, wherein the roller retractor is rotationally biased toward retracting the protective element.

* * * * *

UNITED STATES PATENT AND TRADEMARK OFFICE
CERTIFICATE OF CORRECTION

PATENT NO. : 6,402,239 B1
DATED : June 11, 2002
INVENTOR(S) : Lennart Haglund

It is certified that error appears in the above-identified patent and that said Letters Patent is hereby corrected as shown below:

<u>Title page,</u>
Item [22], delete "Jan. 28, 1998" and insert -- January 22, 1998 --.

Signed and Sealed this

Seventeenth Day of December, 2002

JAMES E. ROGAN
*Director of the United States Patent and Trademark Office*